United States Patent Office 3,254,081
Patented May 31, 1966

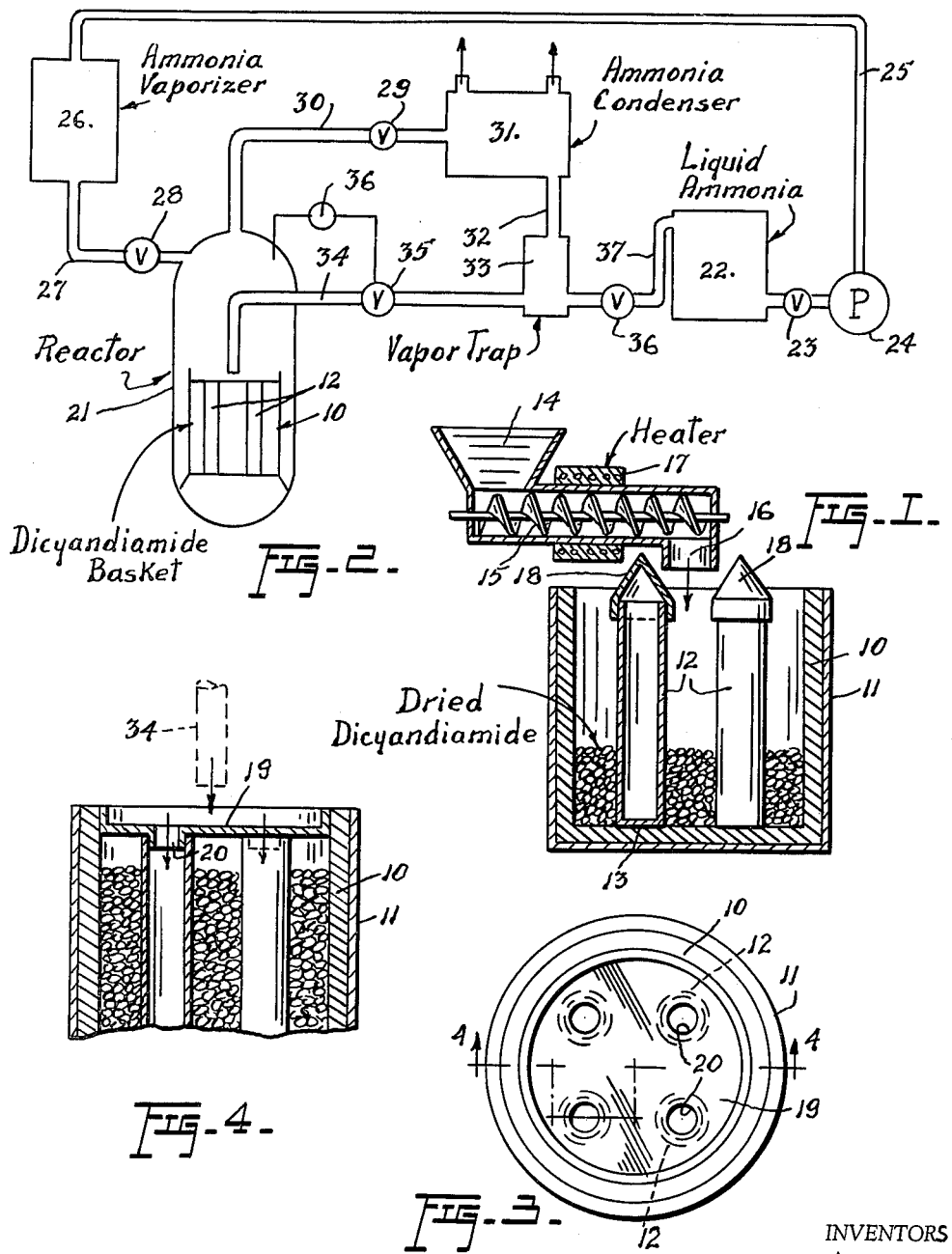

3,254,081
PRODUCTION OF MELAMINE FROM
DICYANDIAMIDE
Alvaro Salgado, Union, N.J., and Dennis L. Gilbertson, Bradford Woods, Pa., assignors to Reichhold Chemicals, Inc., Detroit, Mich.
Filed Oct. 10, 1961, Ser. No. 144,199
7 Claims. (Cl. 260—249.7)

The present invention relates to an improved polymerization process and, more particularly, relates to an improved process of converting dicyandiamide to melamine in the presence of vaporous anhydrous ammonia.

Heretofore, melamine has been known to be prepared by a number of methods. One method, which has been extensively disclosed in literature, is the conversion of dicyandiamide by exothermic polymerization in the presence of anhydrous vaporous ammonia. A number of patent references are known to describe this process generally and specifically. According to the patentees, the main virtue of this prior process is that it results in high conversion of the dicyandiamide to the melamine. Also, these patents and references indicate the importance of the presence of ammonia under pressure during the conversion and during the cooling of the reaction mass. Further, the prior references point out the desirability of utilizing particular materials of construction for the reactor for the purpose of avoiding contamination of the reaction product. Notwithstanding the avowed virtues of the prior art references, it has been found that, although a somewhat acceptable product may be prepared by these prior art methods, the methods are incapable of producing the higher purity material that is becoming more and more necessary as the commercial utilization of melamine increases.

Primarily, extensive efforts have been expended to reduce the amount of undesirable impurities, including melam, in the reaction product. Many attempts have been made to obtain high-purity melamine without costly ancillary processes for improving its purity. As far as it is known, high-purity products can be obtained only by relatively expensive additional processing. Of course, this high process cost is reflected in the price of the product, which obviously decreases the commercialization and utilization of melamine to the ultimate consumer when he can turn to other products, even though they might not otherwise be as suitable.

It is an object of this invention to produce high-purity melamine utilizing relatively simple process techniques.

It is a further object of the present invention to convert dicyandiamide to melamine with a minimum of other reaction products.

It is still a further object of the present invention to produce high-purity melamine from dicyandiamide without the formation of presence of substantial quantities of melam in the reaction mass.

These and other objects of the invention will be apparent from the following description.

It has been discovered that dicyandiamide can be converted to high-purity melamine by a process, which comprises charging dicyandiamide and vaporous anhydrous ammonia to a reaction zone, reacting the dicyandiamide and vaporous ammonia in the reaction zone, removing vaporous ammonia in an ammonia zone, liquefying the removed vaporous ammonia in an ammonia liquefying zone, returning controlled amounts of liquefied ammonia from the liquefying zone to the reaction zone in indirect heat-exchange relationship with the reacting dicyandiamide, vaporizing the liquefied ammonia therein to dissipate the exothermic heat of reaction of the dicyandiamide and recycling the ammonia vapors to the liquefying zone. In this process, it has been found that the product melamine contains substantially no melam, unlike that found in other processes. Even a minor amount of melam present in the product melamine greatly lowers its commercial utilization. This is based on the fact that a product made from melamine containing melam results in a product of inferior clarity, which does not carry with it the high commercial utilization possibilities of melam-free melamine products.

Of substantially equal importance, it is believed that the process of this invention results in a product which is substantially free of other impurities often associated with melamine. The most objectionable impurities in melamine, other than melam, are those which cause inferior color in the resin-end product. Because the subject process does not involve liquid ammonia contact with the reaction mass either before, during or after the conversion, the product mass does not contain significant quantities of color-producing contaminants.

The present process of this invention may be better understood by reference to the appended drawings, which are diagrammatic illustrations of facets of the present invention and of which:

FIGURE 1 is a view, partly in vertical section and partly in elevation, showing a hopper or basket for dried dicyandiamide with means for drying and conveying dicyandiamide thereinto;

FIGURE 2 is a diagrammatic illustration of the apparatus used in the process of converting dry dicyandiamide into susbtantially pure melamine;

FIGURE 3 is a top plan view of the basket shown in FIGURE 1 but with the caps of the tubes removed and a distributor plate for liquid ammonia installed; and FIGURE 4 is a fragmentary vertical sectional view, taken substantially in the plane of the line 4—4 in FIGURE 3.

Referring now to the accompanying drawings in detail, particularly to FIGURE 1, the numeral 10 designates a hopper or basket for dried dicyandiamide, this hopper or basket preferably being made of stainless steel and being enclosed by a jacket 11 of insulating material so as to maintain the dicyandiamide therein at a desired temperature. The hopper or basket has an open top and contains a plurality of spaced, vertical tubes 12, preferably formed from aluminum. The tubes 12 have open upper ends and closed lower ends 13 which may be suitably secured to the bottom of the basket.

Dicyandiamide is fed into the basket 10 from a suitable hopper 14 by a screw conveyor 15 having an outlet 16 discharging into the basket and a suitable heater 17 surrounds the casing of the conveyor 15 so that the dicyandiamide is thoroughly dried and at a temperature of between 120° C. and 150° C. by the time it is discharged through the conveyor outlet 16. In order to prevent the dicyandiamide from falling into the tubes 12 during filling of the basket 10, the upper ends of the tubes are provided with removable caps 18, which are preferably conical in form so as to deflect the dicyandiamide discharged from the conveyor outlet 16 into the space in the basket 10 surrounding the tubes 12.

After the basket 10 is filled with dry dicyandiamide, the caps 18 are removed and a deflector plate 19 is positioned in the open top of the basket over the upper open end of tubes 12, the plate 19 having a plurality of depending tubular necks 20 which extend loosely into the upper ends of the respective tubes 12, as is best shown in FIGURE 4.

The basket 10 as a whole, including the plate 19, is then placed inside a high pressure reactor 21, shown diagrammatically in FIGURE 2, so that in effect it functions as a component of the reactor vessel. The reactor is then sealed and liquid ammonia from a suitable storage tank 22 is delivered through a valve 23 by a pump 24 and through a line 25 to an ammonia vaporizer 26, wherein the liquid ammonia is vaporized by suitable heat exchange means, or the like. The ammonia vapor then passes through a line 27 and valve 28 into the reactor 21 in a quantity sufficient to elevate the pressure therein to approximately 500 to 1,000 p.s.i., and when this pressure is reached, the valves 23 and 28 are closed.

After the initial reaction period, exothermic polymerization of the dicyandiamide begins and proceeds at a rapid rate, as evidenced by a simultaneous increase in temperature and pressure in the reactor 21. When the temperature of the reacting mass reaches approximately 200° C., a vapor relief valve 29 in a line 30 communicating with the top of the reactor is opened, so that vapor in the reactor may pass into a reflux condenser 31. The latter utilizes a suitable heat exchange with cooling means, such as water, causing condensation of the vaporous ammonia into liquid ammonia which passes from the condenser through a line 32 and through a suitable vapor trap 33 to the reactor 21 through the medium of a line 34 equipped with a flow control valve 35 on deflector plate 19 from where it passes through neck 20 into tubes 12. The latter is automatically actuated by a suitable pressure or temperature sensing device 36 in response to pressure or temperature conditions existing in the reactor 21.

The aforementioned circulation of ammonia, that is, the vapor condensation, continues until the temperature in the reactor falls to below approximately 200° C., and when the reaction is concluded, as evidenced by a temperature and pressure drop, a valve 36 is opened in a line 37 extending from the trap 33 to the tank 22, whereby to release from the reactor 21 any pressurized ammonia such as may be present therein, so that the ammonia may be contained within the system for use in the next reaction batch. Opening of the valve 36 permits both liquid and vapor ammonia in the reflux system and reactor to be returned to the storage tank 22.

It is to be noted that the end of the line 34 entering the reactor 21 is located for discharge of liquid ammonia onto the aforementioned deflector plate 19 in the upper end of the basket 10, whereby the liquid ammonia flows through the necks 20 of the deflector plate into the tubes 12 of the basket for indirect heat exchange with the dicyandiamide in the basket, there being no direct contact of the liquid ammonia with the contents of the reactor.

The reactor 21 is opened for product removal and any ammonia remaining therein is first vented to the atmosphere or to suitable collecting means, if preferred, before the product removal is effected.

It has been found that an induction temperature of between 100° and 170° C. is satisfactory for initiation of the reaction. Generally, it is desirable to maintain the temperature below 150° C. to insure that the exotherm does not begin during ammonia addition. Induction temperatures in the neighborhood of 135° C. have been found to be particularly optimum for this reaction.

Since the exothermic heat of reaction will raise the temperature of the reaction mass in excess of 350° C., it has been found that, when cooled according to the aforementioned process, the temperature should be between 225° C. and 325° C. A peak exotherm of about 250° C. has been found to be optimum for high purity products.

It has been found that an initial ammonia pressure of at least 500 p.s.i.g. is necessary during the induction period to insure a high purity product. A minimum of at least 1000 p.s.i.g. is necessary to prevent product degradation while the temperature of the reaction mass is in excess of 175° C. It is believed that there is no upper limit to the pressure at which this reaction will take place. Rather, the maximum limitation of the tolerable pressure is dictated by the mechanical strength of the reaction vessel.

Generally, it has been found that ammonia should be present in the reaction mass to prevent decomposition of the dicyandiamide during the polymerization reaction. Additionally, during the reaction, it has been found that ammonia, particularly in liquefied form, should be present and is necessary to control the reaction conditions. The flow of liquefied ammonia to the reaction zone, wherein the liquefied ammonia is in indirect heat-exchange relationship to the dicyandiamide, is a function of either the reaction temperature or pressure and, thus, may be responsive to either or both. Thus, regulating or controlling the flow of liquefied ammonia to the reaction zone results in controlling the rate of polymerization of dicyandiamide.

Although the ammonia is generally preferred in the process of this invention, it has been found that the mixtures of ammonia with inert gases, such as nitrogen, may be employed. Also, it is possible, although not preferred, to use inert solvents, such as methanol, and the like. In such conditions, it is feasible to regulate the reaction rate and reduce the reaction time by removing volatized solvent and liquefying it through indirect heat exchange prior to its return to the reaction zone.

While various specific embodiments of the invention have been illustrated and described, many modifications and adaptations may be made without departing from the invention, and all such changes, as are included within the scope of the claims, are embraced thereby.

The process of the present invention will be better understood by reference to the following examples, which are illustrative and are not to be taken as limiting the scope of the invention.

*Example I*

This example is presented solely for the purpose of illustrating prior art processes and for comparison purposes.

An aluminum can was charged with 2020 g. of dicyandiamide at 135° C. The can was placed in a stainless steel high pressure autoclave, and 257 g. of gaseous ammonia was introduced into the system giving an initial pressure of 540 p.s.i. The heat was turned on to the autoclave and the temperature maintained at 135° C. for one hour, at which point the temperature began to rise very rapidly, over a period of 2 minutes, to 350° C. Immediately, it began to drop. The pressure rose as rapidly to a peak of 1390 p.s.i. and then began to drop slowly. After 30 minutes, the temperature had dropped to 160° C. and the pressure had dropped to 1290 p.s.i.; the system was slowly vented to the atmosphere over a period of 2 hours. When the crystalline product was removed from the aluminum can for analysis, it was found to contain a core of brown material. The degree of discoloration increased toward the center, i.e., from white to a dark beige. Apparently, discoloration was directly proportional to the concentration of the heat. The product upon analysis was found to contain 98.7 percent melamine and 0.205 percent water insolubles.

*Example II*

This example is presented to illustrate the undesirable consequences associated with melamine processes involving direct contact of refluxed liquid ammonia with the reaction mass.

A stainless steel autoclave was charged with 1878 g. of dicyandiamide at 105° C. A stainless steel cooling coil was inserted into the mass and connected through the top to a cold water source. The heat was applied to the unit raising the temperature of the dicyandiamide to 150° C. over a period of 1 hour. 160 g. of vaporous ammonia was introduced resulting in a pressure of 600 p.s.i. Within ten minutes, the reaction had kicked off. As soon as the exotherm became evident, the cooling water was turned on causing the ammonia to reflux. The cooling held the peak exotherm to 295° C. and the peak pressure to 910 p.s.i. In 15 minutes, the temperature had dropped to 150° C. and the system was vented to the atmosphere.

When the product was removed from the autoclave, the reaction mass was badly discolored, i.e., black and green. The product was removed from the autoclave and analyzed. It was found to consist of 90.2 percent melamine and 6.3 percent water insolubles.

In this example, the degrading effect of liquid ammonia product contact is indicated. The cold surface of the cooling coil had chilled the ammonia causing it to condense. The liquid ammonia leached metallic impurities from the stainless steel, and carried them into the reaction mass. These metallic impurities, deposited by the ammonia upon revaporization, served to promote the degradation of the melamine into melam and other de-ammoniation products. As a result, the product was of much poorer quality than would have been obtained if the cooling coil had not been employed.

*Example III*

A stainless steel autoclave was charged with 1669 g. of dicyanadiamide at 150° C. A 1" diameter tube, sealed at the bottom, was placed in the center of the reaction mass. An aluminum funnel, covering the entire top of the reaction mass, was inserted in the autoclave with its discharge in the aluminum tube. A small cooling coil was placed in the funnel and connected through the top to a cold water source. The autoclave was closed, and 304 g. of anhydrous gaseous ammonia was introduced to give an initial pressure of 600 p.s.i. Within 5 minutes, the exotherm had begun. As soon as the exotherm had become apparent, the cooling water was turned on, causing the ammonia to reflux through the funnel into the blanked tube. By this means, the peak exotherm was limited to 262° C. and the peak pressure to 1600 p.s.i. In 10 minutes, the temperature had dropped to 175° C. with a corresponding pressure of 1350 p.s.i. The system was vented and the white crystalline product was removed for analysis.

The product was analyzed and found to consist of 98.1 percent melamine and 0.01 percent insolubles.

In Example III, the beneficial effect of the indirect cooling process is realized. While the analyzed purity of the melamine has not been altered significantly from the product produced without cooling, the amount of insoluble material has been reduced twenty fold.

Since the important criteria of judging the suitability of melamine for resinous applications is the quality of the resin itself, butylated melamine formaldehyde syrups were prepared with material from Examples I and III.

The resin prepared from melamine produced in Example I had an APHA color of 80 and exhibited a stability of about 45 days. After 45 days, the resin took on a hazy appearance, which became increasingly more pronounced until the resin became opaque. An identical resin prepared with melamine produced in Example III had an APHA color of 35 and exhibited stability in excess of 7 months without any visible hazing.

What is claimed is:

1. A process for converting dicyandiamide to melamine, which comprises charging dicyandiamide and vaporous anhydrous ammonia to a reaction zone, heating the dicyandiamide and vaporous ammonia from said reaction zone, liquefying the removed vaporous ammonia in a liquefying zone, returning regulated amounts of liquefied ammonia from the ammonia liquefying zone to the reaction zone wherein the liquefied ammonia is in indirect contact through heat-exchange relationship with the reacting dicyandiamide, vaporizing the liquefied ammonia therein to thereby dissipate the exothermic heat of reaction of the reacting dicyandiamide and recycling the ammonia vapors to the liquefying zone, there being no direct contact between the liquefied ammonia and the reaction mass at any time during the process.

2. An improved method for manufacturing melamine by conversion of dicyandiamide in the presence of vaporous ammonia, which comprises charging dicyandiamide and vaporous anhydrous ammonia to a reaction zone, elevating the temperature of the reaction zone to reaction temperatures, removing vaporous ammonia from said reaction zone, liquefying the removed vaporous ammonia in a liquefying zone, returning regulated amounts of liquefied ammonia to the reaction zone in indirect contact through heat-exchange relationship with the reacting dicyandiamide, vaporizing the liquefied ammonia to thereby dissipate the exothermic heat of reaction of the reacting dicyandiamide and recycling the ammonia vapors to the liquefying zone, there being no direct contact between the liquefied ammonia and the reaction mass at any time during the process.

3. An improved process for converting dicyandiamide to melamine in a closed system comprising the reaction zone and an ammonia liquefying zone, which comprises charging dicyandiamide and vaporous anhydrous ammonia to the reaction zone, heating and raising the pressure of the dicyandiamide and vaporous anhydrous ammonia in the reaction zone to reaction conditions, removing vaporous ammonia from the reaction zone, liquefying the removed vaporous ammonia in the ammonia liquefying zone, returning regulated amounts of liquefied ammonia from the ammonia liquefying zone to the reaction zone wherein the liquefied ammonia is in indirect contact through heat-exchange relationship with the reacting dicyandiamide, vaporizing the liquefied ammonia therein to thereby dissipate the exothermic heat of reaction of the reacting dicyandiamide and recycling the ammonia vapors to the ammonia liquefying zone, there being no direct contact between the liquefied ammonia and the reaction mass at any time during the process.

4. The process of claim 3, wherein the reaction temperature is between about 225° C. and about 325° C.

5. The process of claim 3, wherein the reaction pressure is between about 1000 p.s.i. and about 2000 p.s.i.

6. An improved process for converting dicyandiamide to melamine in a closed system comprising the reaction zone and an ammonia liquefying zone, which comprises charging dicyandiamide and vaporous anhydrous ammonia to the reaction zone, reacting the dicyandiamide in the reaction zone in the presence of vaporous anhydrous ammonia, removing vaporous ammonia from the reaction zone, liquefying the removed vaporous ammonia in the ammonia liquefying zone, returning controlled amounts of liquefied ammonia from the ammonia liquefying zone to the reaction zone wherein the liquefied ammonia is in indirect contact through heat-exchange relationship with the reacting dicyandiamide, vaporizing the liquefied ammonia therein to thereby dissipate the exothermic heat of reaction of the reacting dicyandiamide and recycling the ammonia vapors to the ammonia liquefying zone, there being no direct contact between the liquefied ammonia and the reaction mass at any time during the process.

7. The process of claim 6, wherein the flow of the returned liquefied ammonia is controlled by a temperature responsive means associated with the temperature of the reacting dicyandiamide.

References Cited by the Examiner

UNITED STATES PATENTS

| | | | |
|---|---|---|---|
| 2,191,361 | 2/1940 | Widmer et al. | 260—249.7 |
| 2,375,731 | 5/1945 | Caldwell et al. | 260—249.7 |
| 3,133,063 | 5/1964 | Vialaron | 260—249.7 |

FOREIGN PATENTS

| | | |
|---|---|---|
| 524,349 | 8/1940 | Great Britain. |
| 814,934 | 6/1959 | Great Britain. |

OTHER REFERENCES

Smolin et al., "s-Triazines and Derivatives," The Chemistry of Heterocyclic Compounds, Interscience Publishers, Inc., New York, 1959, pages 318–20.

WALTER A. MODANCE, *Primary Examiner.*

JOHN D. RANDOLPH, J. M. FORD,
*Assistant Examiners.*